Sept. 27, 1955                A. G. HOSE ET AL                2,718,791
        EDGE REINFORCEMENT FOR PAPER-MAKING WOVEN WIRE BELTS
            AND THE METHOD OF APPLYING THE REINFORCEMENT
                       Filed Dec. 2, 1950
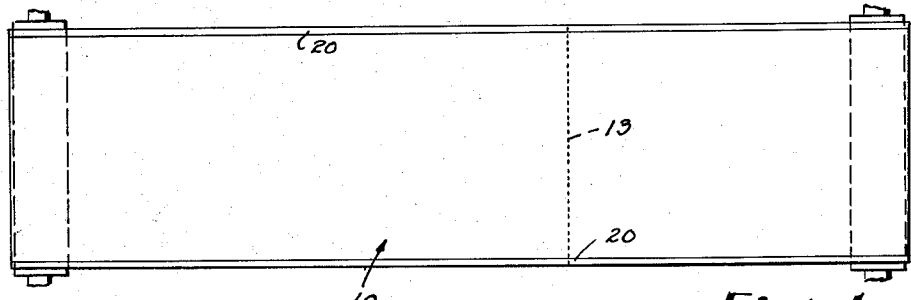
Fig.1
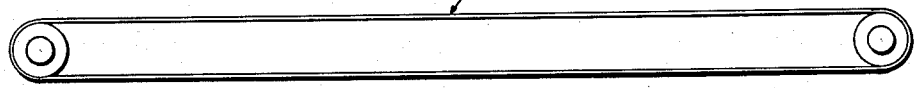
Fig.2
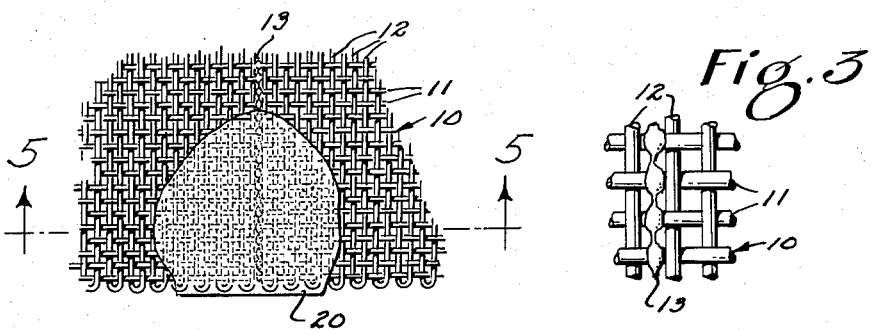
Fig.3
Fig.4
Fig.5
INVENTORS.
ALFRED G. HOSE,
GEORGE P. WENNES JR.
HENRY L. SALTER
BY Bates, Teare, & McBean
        Attorneys

2,718,791

EDGE REINFORCEMENT FOR PAPER-MAKING WOVEN WIRE BELTS AND THE METHOD OF APPLYING THE REINFORCEMENT

Alfred G. Hose, Lakewood, George P. Wennes, Jr., Mayfield Heights, and Henry L. Salter, South Euclid, Ohio, assignors to The Lindsay Wire Weaving Company, Cleveland, Ohio, a corporation of Ohio Application December 2, 1950, Serial No. 198,784

3 Claims. (Cl. 74—239)

In the use of woven wire belts in Fourdrinier paper making machines, it has been found that the belt sometimes fails at the edges and especially at the ends of the transverse seam which connects the woven wire fabric in making an endless belt. To prolong the life of the belt it has been customary to reinforce the seam at the ends by additional wire sewed into the cloth to increase the strength in this area. Such sewing, however, increases the stiffness of the cloth in that region and thereby reduces the flexibility, soon causing cracking of the reinforced region.

An object of this invention is to provide a reinforcement at the margins of the belt and particularly at the ends of the seam which will effectively strengthen the belt in the weak region without materially stiffening the belt or materially increasing its thickness. A further object is to provide a reinforcement of a character which may be readily applied either when the belt is originally produced or on the job while the belt is in position in the Fourdrinier machine.

We accomplish the desirable results by applying plastic material to the margins of the belt and at least at the end of the transverse seam, such material occupying the interstices in the belt and the spaces between the top and bottom planes of the belt without materially thickening the belt. The material employed is preferably a thermoplastic, such as polyethylene, and it is then applied hot and soft and allowed to cool and harden in place. We prefer to supply the plastic in the form of thin sheets above and below the belt which when heated and pressed onto the belt pass into all the intermediate spaces within the belt.

Our invention is illustrated in the drawing hereof and hereinafter described in greater detail.

In the drawing, Fig. 1 is a plan of a woven wire belt extending around to end rollers of a Fourdrinier machine and having our reinforcement extending along the entire margins; Fig. 2 is an edge view of the applied belt; Fig. 3 is an enlarged fragmentary plan of a portion of the belt at the seam, which is illustrated as a soldered or welded seam; Fig. 4 is a plan of a marginal portion of a belt on opposite sides of the seam, with our reinforcement applied in that region only; Fig. 5 is a cross section on a greatly enlarged scale through the seamed belt after the plastic has been applied, as indicated by the line 5—5 on Fig. 4.

In the drawing, 10 indicates a woven wire belt of any suitable weave composed of warp wires 11 and lay wires 12, the fabric sheet being joined by a transverse seam 13. This seam is indicated in Fig. 3 as effected by soldering. It may be accomplished by welding the abutting ends of the warp wires, the effect of which is substantially the same as that indicated at 13 in Fig. 4. The seam may also be made by looping a stitching wire continuously about lay wires adjacent the end of the fabric forming the belt. Our invention is equally applicable to belts having any of such seams.

In Fig. 1, we have indicated at 20 the plastic material along the entire edges of the belt, and in Fig. 4 at 20 the same reinforcement adjacent the seam, and in Fig. 5 we have shown the plastic material entirely filling the interstices of the belt in any region to which it is applied. The upper and under surfaces of the applied plastic is only very slightly above the high and low points of the woven wire.

The preferred manner of introducing the plastic into the woven wire belt, especially when reinforcing only the region at the ends of the seam, is by placing sheets of plastic of suitable width and thickness in contact with the top and bottom of the belt and then applying pressure and heat sufficient to cause the plastic to flow into all of the interstices between the two plastic patches. With a belt of ordinary mesh the plastic sheet need be only a few thousandths of an inch in thickness. In any event, the amount of plastic used is such that the thickness of the woven wire belt in the area treated is only slightly increased, preferably not more than 5%.

By using a thermoplastic material of a type which is flexible and elastic but develops a high tensile strength after being cold stressed, we produce a result where the marginal edge treated, which may be the end region of the seam, becomes really stronger than other portions of the belt, without interfering at all with the flexibility of the belt or the thickness of it.

The exposed surface of the applied plastic is very smooth and slides readily across the frames of the suction boxes in the Fourdrinier machines. The regions to which the plastic material is applied are beyond the interior of the suction boxes, so that the elimination of open spaces through the belt in the reinforced region has no effect on the drainage of the belt as used in the machine.

We prefer to employ a polyethylene thermoplastic of the lubricated type having an extrusion temperature in the range from 300 to 450° F.

One of the desirable features of our invention is that the reinforce may be applied at the time of joining the fabric to make the belt and delivered with the belt for use, or it may be applied during the period of use of the belt and while it is in the Fourdrinier machine. The reinforce is durable, does not crack by flexing about the rollers of the belt and lasts as long as the belt itself.

We claim:

1. The method of reinforcing a woven wire belt at an edge thereof comprising placing sheets of thermo-plastic material of lesser thickness than the belt on the upper and under sides of the belt at such region, heating such sheets and forcing their substance into the interstices and over the wires of the belt at such region without materially thickening the belt, and allowing the applied material to cool and harden in place, said material having a pronounced tensile strength after being cold stressed and being very flexible.

2. A woven wire belt having a reinforcement adjacent an edge thereof comprising, thermo-plastic material of the lubricated type encompassing each of the wires and occupying the interstices therebetween at such region of the belt, said material having an extrusion temperature in the range from 300 to 450° F. and having a high tensile strength after being cold-stressed while remaining very flexible, and said reinforcement presenting a smooth non-friction surface projecting only a negligible distance above or below the surface of the belt.

3. A woven wire belt having a reinforced seam characterized by having thermoplastic material of high tensile strength completely occupying the interstices between the wires and encompassing each of the wires at and on all sides of the seam to provide a smooth belt surface extending continuously over the seam without materially thickening the belt.

(References on following page)

References Cited in the file of this patent

UNITED STATES PATENTS

| | | |
|---|---|---|
| 307,091 | Brigham | Oct. 28, 1884 |
| 398,423 | Midgley | Feb. 26, 1889 |
| 410,250 | Midgley | Sept. 3, 1889 |
| 1,590,371 | Haven | June 29, 1926 |
| 2,015,087 | Rafton | Sept. 24, 1935 |
| 2,495,045 | Woodbury et al. | Jan. 17, 1950 |
| 2,607,715 | Waldes | Aug. 19, 1952 |
| 2,659,958 | Johnson | Nov. 24, 1953 |